June 10, 1952     I. E. ASKE     2,599,883
GRASS CLIPPING GUIDE FOR LAWN MOWERS
Filed July 8, 1948
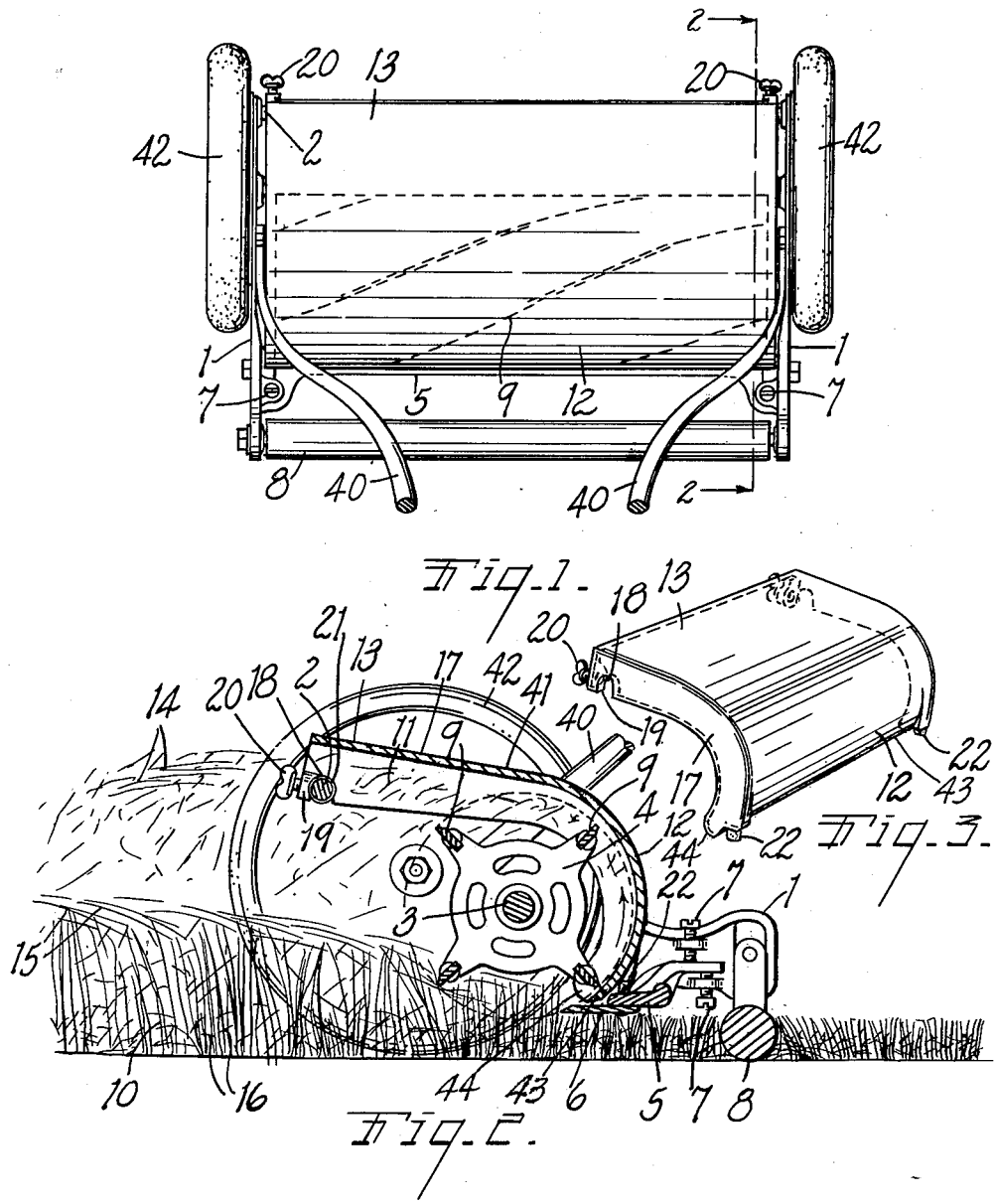
INVENTOR.
Irving E. Aske
BY
ATTORNEY.

Patented June 10, 1952

2,599,883

UNITED STATES PATENT OFFICE 2,599,883

GRASS CLIPPING GUIDE FOR LAWN MOWERS

Irving E. Aske, Muskegon, Mich.

Application July 8, 1948, Serial No. 37,672

8 Claims. (Cl. 56—249)

This invention relates to improvements in a grass clipping guide for lawn mowers.

The main objects of this invention are:

First, to provide a lawn mower in which the cuttings or clippings are reduced to such length that they fall between the blades of grass and are inconspicuous and at the same time serve as an effective mulch.

Second, to provide a cutting reel housing and grass clipping guide member which may be readily applied to types of lawn mowers now in general use and may be quickly and easily removed without tools should occasion require or render desirable the operation of a mower with a grass catcher.

Third, to provide a lawn mower structure having these advantages which is very simple and economical and at the same time efficient.

Fourth, to provide a method of mowing lawns in which the lawn after mowing has an attractive appearance and at the same time the clippings or cuttings are utilized or available for mulching and fertilizing.

Further objects relating to details and economies of the invention will appear from the description to follow. The invention is pointed out in the claims.

A preferred embodiment of the invention is illustrated in the accompanying drawings, in which:

Fig. 1 is a plan view of a lawn mower embodying my invention the handle being mainly broken away.

Fig. 2 is a vertical section somewhat enlarged on a line corresponding to line 2—2 of Fig. 1.

Fig. 3 is a perspective view of the clipping guide member.

In the accompanying drawings certain parts are shown mainly conventionally as the details thereof form no part of my invention.

In the embodiment of my invention illustrated the chassis or frame comprises side members 1—1 and the cross rod 2. The ground engaging supporting and reel driving wheels 4L are suitably mounted and have suitable driving connection, not illustrated, to the shaft 3 of the reel 4. The driving connections are not illustrated as suitable driving connections are well known in the art. The arms 40 of the bifurcated handle are suitably pivoted to the frame.

The cutter bar 5 is provided with a cutting blade 6. This cutter bar is adjustably mounted, the adjusting screws 7—7 being provided for adjusting and securing the cutter bar in its adjusted positions. The roller 8 is adjustably mounted. The details of these adjustable mountings form no part of my present invention.

The reel blades 9 are of the spirally curved type, as indicated by dotted lines in Fig. 4, and coact with the cutter blade 6 which constitutes a shear blade. The blades 9 are of radially disposed section.

In Fig. 2 I conventionally illustrate uncut grass at 10 and the cut grass at 11. It is common practice in lawn mowers of this type to employ a grass catcher which is disposed at the rear of the mower the clippings being discharged or impelled into the catcher by the reel. It is recognized as desirable to leave the clippings on the lawn in order to mulch the roots and to provide fertilizer but this results in an unsightly condition at least for several days after mowing as the weathered or dried clippings are visible on top of the cut grass. By my method and apparatus the clippings are chopped into such lengths that they promptly fall between the blades of grass and are inconspicuous and at the same time serve efficiently as a mulch and in due time as a fertilizer. To accomplish this I provide a reel housing and clipping guide member designated generally by the numeral 41 and comprising a rearwardly curved rear portion 12 and a rearwardly inclined front portion 13 which is tangential to and merges into the rear portion 12.

The curvature of the rear portion 12 is such that it quite closely embraces the reel but is slightly involute relative thereto. The clippings are impelled upwardly and forwardly by the rotation of the reel which is believed to act or serve, to a substantial degree, as the rotor of a fan or blower, the guide member constituting a partial casing therefor. The side flanges 17 extend closely to the blade and in the embodiment illustrated increase in width forwardly. The cuttings are impelled forwardly and discharge on the uncut grass in advance of the mower, as indicated at 14, the longer clippings being supported by the uncut grass as indicated at 15. These clippings or cuttings are ordinarily of such length that they remain in the supported condition, but the shorter lengths, as indicated at 16, fall between the blades of grass. The cuttings or clippings 15 supported by the uncut grass are gathered up along with the clippings as they are cut from the uncut grass and are chopped up into shorter lengths so that they will fall between the blades of grass as has been described. Some of them may be subjected to the cutting action more than once.

The housing and clipping guide member is preferably removably supported, and to accomplish that its side flanges 17 are provided with notches 18 facing downwardly and adapted to engage over the rod 2. Lugs 19 are threaded to receive the set screws 20 which clampingly secure the guide member to the rod. A packing ring of tape or the like 21 is arranged around the rod so that there is no metal to metal contact between the guide member and the rod. The guide member is provided with resilient feet 22 at its rear end which rests on the cutter bar thereby providing an effective mounting and one which deadens sound and prevents chattering.

It will be noted that the feet 22 are positioned so that the rear edge 43 of the guide member is supported at the front of and close to the blade 6 and that the lower ends 44 of the side flanges project beyond its edge 43. This relationship of the parts and the flanges prevent the clippings being discharged sidewise of the guide. Further the positioning of the rear edge 43 close to the blade prevents clogging.

The embodiment of my invention illustrated is highly efficient and practical. It may be very economically produced and readily adapted to or embodied in mowers now in extensive use. I have not attempted to illustrate various modifications and adaptations which I contemplate as it is believed that this disclosure will enable those skilled in the art to embody or adapt my invention as may be desired.

Having thus described my invention, what I claim as new and desire to secure by Letters Patent is:

1. The combination with a lawn mower including a cutting reel, a cutter bar, and a tie bar disposed above the plane of the cutting reel and forwardly thereof, of a clipping guide member comprising a rearwardly curved rear portion disposed closely adjacent to the reel to embrace a substantial portion of the reel blades above the cutter bar on their up stroke, and a rearwardly inclined top portion merging with and projecting forwardly tangentially of the rear portion and in overhanging relation to and extending forwardly substantially beyond the reel, the lower edge of the rear portion of the guide member being disposed closely adjacent the cutter bar and circular path of travel of the reel, the guide member progressively increasing in distance from said circular path, from said lower edge of the rear portion of the guide member to the forward edge of the top portion thereof, said guide member having side flanges provided with downwardly facing cross rod engaging notches at their forward ends, and lugs adjacent said notches, said lugs being provided with screws for clamping the guide member to the cross rod, said rod being provided with non-metallic padding for said guide member, resilient cushioning feet at the rear end of said guide member resting on said cutter bar, said side flanges being disposed to embrace the ends of the reel blades throughout a substantial portion of the upward movement of the reel blades, said guide member and side flanges being supportingly connected to each other to permit the same to be assembled as a unit to said frame cross rod and to be detached as a unit therefrom, said guide member coacting with said reel to direct and discharge the clippings cut and impelled by the reel forwardly upon the uncut grass in front of the mower whereby clippings of such length as to be supported by the uncut grass are again subjected to the cutting action of the reel as the mower is advanced.

2. In a lawn mower, a frame comprising end members and a cross rod, supporting and reel driving wheels, a cutter bar provided with a cutter blade, a driven cutting reel provided with blades coacting with said cutter blade, said cross rod being disposed in advance of and above the plane of the top of the reel, a clipping guide member comprising a rearwardly curved rear portion disposed closely adjacent to the reel to embrace a substantial portion of the reel blades above the cutter bar on their up stroke, and a rearwardly inclined top portion merging with and projecting forwardly tangentially of the rear portion and in overhanging relation to and extending forwardly substantially beyond the reel, the lower edge of the rear portion of the guide member being disposed closely adjacent the cutter bar and circular path of travel of the reel, the guide member progressively increasing in distance from said circular path, from said lower edge of the rear portion of the guide member to the forward edge of the top portion thereof, said guide member having side flanges provided with downwardly facing cross rod engaging notches at their forward ends, the rear end of the guide member being supported by said cutter bar, said side flanges being disposed to embrace the ends of the reel blades throughout a substantial portion of the upward movement of the reel blades, said guide member and side flanges being supportingly connected to each other to permit the same to be assembled as a unit to said frame cross rod and to be detached as a unit therefrom, said guide member coacting with said reel to direct and discharge the clippings cut and impelled by the reel forwardly upon the uncut grass in front of the mower whereby clippings of such length as to be supported by the uncut grass are again subjected to the cutting action of the reel as the mower is advanced.

3. The combination with a lawn mower including a cutting reel, a cutter bar, and a tie bar disposed above the plane of the cutting reel and forwardly thereof, a clipping guide comprising a rearwardly inclined flat top portion and a downwardly extending forwardly facing curved rear portion integrally merging into said top portion, the bottom edge of said curved rear portion being supportingly engaged with said cutter bar, said guide having downwardly projecting continuous side flanges extending from its rear end forwardly and spaced and disposed to receive a blade of a reel between them on the up stroke thereof, the inner face of said guide between said flanges being smooth, the flanges having a downwardly facing tie bar engaging notches adjacent their front end and set screws on said flanges for engagement with the tie bar engaged in the notches.

4. The combination with a lawn mower including a cutting reel, a cutter bar, and a tie bar disposed above the plane of the cutting reel and forwardly thereof, a clipping guide comprising a rearwardly inclined flat top portion and a downwardly extending forwardly facing curved rear portion integrally merging into said top portion, the bottom edge of said curved rear portion being supportingly engaged with said cutter bar, said guide having downwardly projecting continuous side flanges extending from its rear end forwardly and spaced and disposed to receive a blade of a reel between them on the up stroke thereof, the inner face of said guide between said flanges being smooth, the front of said guide resting upon and being retainingly engaged with said tie bar.

5. The combination with a lawn mower including a cutting reel, a cutter bar, and a tie bar disposed above the plane of the cutting reel and forwardly thereof, a clipping guide comprising a rearwardly inclined flat top portion and a downwardly extending forwardly facing curved rear portion integrally merging into said top portion, the bottom edge of said curved rear portion being supportingly engaged with said cutter bar, the curvature of said rear portion increasing from its lower edge to its mergence with the top portion, said guide having downwardly projecting continuous side flanges extending from its rear end forwardly and spaced and disposed to receive a blade of a reel between them on the up stroke thereof, the inner face of said guide between said flanges being smooth, the front of said guide resting upon and being retainingly engaged with said tie bar.

6. A clipping guide for a conventional lawn mower comprising a rearwardly inclined flat top portion, and a downwardly extending forwardly facing curved rear portion integrally merging into said top portion, its lower edge being supportingly engageable with the cutter bar of a mower at the rear of the cutter reel thereof, said guide having downwardly projecting continuous side flanges of a substantial width and extending from its rear end forwardly and spaced and disposed to receive the blades of the cutting reel between them on the up stroke thereof, the inner face of the guide between said flanges being unobstructed, the flanges having downwardly facing tie bar engaging notches adjacent their front end and set screws on said flanges for engagement with a tie bar with which the notches are engaged.

7. A clipping guide for a conventional lawn mower comprising a rearwardly inclined flat top portion, and a downwardly extending forwardly facing curved rear portion integrally merging into said top portion, its lower edge being supportingly engageable with the cutter bar of a mower at the rear of the cutter reel thereof, said guide having downwardly projecting continuous side flanges of a substantial width and extending from its rear end forwardly and spaced disposed to receive the blades of the cutting reel between them on the up stroke thereof, the inner face of the guide between said flanges being unobstructed.

8. A clipping guide for a conventional lawn mower comprising a rearwardly inclined flat top portion, and a downwardly extending forwardly facing curved rear portion integrally merging into said top portion, its lower edge being supportingly engageable with the cutter bar of a mower at the rear of the cutter reel thereof, the curvature of said rear portion increasing from its lower edge to its mergence with the top portion, said guide having downwardly projecting continuous side flanges of a substantial width and extending from its rear end forwardly and spaced and disposed to receive the blades of the cutting reel between them on the upstroke thereof, the inner face of the guide between said flanges being unobstructed.

IRVING E. ASKE.

REFERENCES CITED

The following references are of record in the file of this patent:

UNITED STATES PATENTS

| Number | Name | Date |
|---|---|---|
| 1,767,510 | Carlson | June 24, 1930 |
| 1,819,133 | Stegeman et al. | Aug. 18, 1931 |
| 2,066,174 | Cregier | Dec. 29, 1936 |
| 2,238,707 | Ronning | Apr. 15, 1941 |
| 2,486,969 | Nelson | Nov. 1, 1949 |
| 2,517,184 | Elliott et al. | Aug. 1, 1950 |
| 2,517,855 | Elliott et al. | Aug. 8, 1950 |